United States Patent [19]

Thomas

[11] 4,155,822

[45] May 22, 1979

[54] ISOTOPE SEPARATION PROCESS

[75] Inventor: William R. L. Thomas, Holmdel, N.J.

[73] Assignee: Exxon Research & Engineering Co., Florham Park, N.J.

[21] Appl. No.: 865,122

[22] Filed: Dec. 28, 1977

Related U.S. Application Data

[63] Continuation of Ser. No. 680,180, Apr. 26, 1976, abandoned.

[51] Int. Cl.² ................................................ B01J 1/10
[52] U.S. Cl. ...................... 204/157.1 R; 204/DIG. 11
[58] Field of Search .................. 204/157.1 R, DIG. 11

[56] References Cited

U.S. PATENT DOCUMENTS 3,937,956  2/1976  Lyon .............................. 204/157.1 R

*Primary Examiner*—Howard S. Williams

[57] ABSTRACT

The instant invention relates to an improved process for separating a material into two or more parts in each of which the abundances of the isotopes of a given element differ from the abundances of the isotopes of the same element in said material. More particularly, the invention relates to a method for the isotopically selective excitation of gas phase molecules by multiple infrared photon absorption followed by a step wherein more of the excited molecules than non-excited molecules are converted to a chemically different form which may be separated by means known in the art. This invention is useful for, but not limited to, the separation of the principal isotopes of uranium.

6 Claims, No Drawings

ISOTOPE SEPARATION PROCESS

This is a continuation of application Ser. No. 680,180, filed Apr. 26, 1976, now abandoned.

BACKGROUND OF THE INVENTION

Related Applications

This application is related to U.S. patent application Ser. No. 606,508 filed Aug. 21, 1975, which is a continuation in part of U.S. Ser. No. 570,849 filed Apr. 23, 1975, which in turn is a continuation in part of U.S. Ser. No. 408,669 filed Oct. 23, 1973, all in the name of Richard K. Lyon. Both U.S. Ser. No. 408,669 and the C.I.P.'s thereof are hereby incorporated by reference.

1. Field of the Invention

The instant invention relates to an improved process for separating a material into two or more parts in each of which the abundances of the isotopes of a given element differ from the abundances of the isotopes of the same material. More particularly, the invention relates to a method for the isotopically selective excitation of gas phase molecules by multiple infrared photon absorption followed by selective reaction of said excited molecules with a gaseous reagent to form a product which may be separated by means known in the art. This invention is useful for, but not limited to, the separation of the principal isotopes of uranium.

2. Description of the Prior Art

In order that the instant invention may be clearly understood, it is useful to review the prior art relating to photochemical isotope separation. U.S. Pat. No. 2,713,025 and British Pat. No. 1,237,474 are good examples of processes for the photochemical separation of the isotopes of mercury. The first requirement for a photochemical isotope separation is that one finds conditions such that atoms or molecules of one isotope of a given element absorb light more strongly than do atoms or molecules of another isotope of said element. Mercury is a volatile metal and readily forms a vapor of atoms. Said atoms absorb ultraviolet light at 2537 Å. The absorption line of $Hg^{202}$ is displaced by about 0.01 Å with respect to the absorption line of $Hg^{200}$. Since the absorption lines are extremely narrow, one may by use of a light in a critically narrow wavelength region excite either $Hg^{200}$ or $Hg^{202}$ without substantially exciting the other, depending on the exact wavelength used.

The second requirement for a photochemical isotope separation is that those atoms or molecules which are excited by light undergo some process which the atoms or molecules which have not been excited do not undergo, or at least do not undergo as rapidly. A quantum of 2537 Å ultraviolet light imparts an excitation of 112.7 Kcal/mole to the mercury atom which absorbs it. The number of mercury atoms which at room temperature are thermally excited to this energy is vanishingly small, hence the atoms excited by light are not diluted by atoms excited by thermal means. Atoms of this high excitation readily undergo reactions with $H_2O$ (as taught in the U.S. parent) or with $O_2$, HCl or butadiene (as taught in the British patent), said reactions not occurring at room temperature with unexcited mercury.

Uranium, however, is a highly refractory metal, boiling only at extremely high temperatures. Thus use of the above-described process with uranium atoms instead of mercury involves obvious difficulties. However, U.S. Pat. No. 3,772,519 teaches a process for separating uranium by selectively exciting atoms of a Uranium atom vapor with a laser. This process operates at temperatures of about 2300° C. (in order to provide a uranium vapor having a sufficient concentration of uranium atoms) and the laser emits light in the visible region of the spectra.

The most volatile form of uranium is $UF_6$. $U^{235}F_6$ and $U^{238}F_6$ both absorb ultraviolet light and are reported to do so to the same extent at all wavelengths in the UV; hence, UV excitation of $UF_6$ does not satisfy the first requirement of photochemical isotope separation. However, $UF_6$ will also absorb infrared light in the region around 626 $cm^{-1}$ (the $\nu_3$ band) and 189 $cm^{-1}$ (the $\nu_4$ band). Both the $\nu_3$ and $\nu_4$ bands of $U^{235}F_6$ are shifted slightly toward higher energy with respect to the $\nu_3$ and $\nu_4$ bands of $U^{238}F_6$ respectively, but the size of these shifts is small compared to the width of the bands; in other words, the infrared absorption spectra of $U^{238}F_6$ and $U^{235}F_6$ do not exactly coincide, but they overlap at all wavelengths so that if one isotope absorbs light, so, to a substantial degree, will the other. Hence the infrared excitation of $UF_6$ by absorption of a single IR photon is a process of limited isotopic selectivity.

The second requirement for isotope separation is also a matter of some difficulty for $UF_6$. $UF_6$ molecules which are excited by IR light are no different from molecules which have received the same energy by thermal excitation. Whatever process the photo-excited molecules will undergo, those molecules which are thermally excited to the same energy will also undergo. This dilution of the photo-excited molecules with thermally excited molecules will further decrease the isotopic separation factor.

U.S. Ser. No. 480,669 and the CIP's thereof teach a means for overcoming the above-described difficulties, namely multiple photon excitation. Under a set of critical conditions, therein described, molecules could be irradiated so as to absorb several photons. Since the excited molecules thus formed contain the energy of several photons the problem of dilution by thermally excited molecules is minimized. Further, since several photons are absorbed, each in an isotopically preferential manner, then the isotopic selectivity of the overall excitation process is the result of compounding the selectivity the individual photon absorbtions and has a substantial greater isotopic selectivity than single photon absorbtion. The excitation step thus provides a means by which molecules containing one isotope may be heated more than molecules containing another isotope. The heated molecules may be converted to a chemically different form by any means whose rate or selectivity are sensitive to temperature. Such means include chemical reaction with a second gaseous specie, photolysis and allowing the heated molecules to undergo unimolecular decomposition. Said chemically different form is then recovered and separated from the unconverted molecules in the final step by any means known in the art.

The instant invention is similar to the above-described invention but teaches an improved method for carrying out the excitation step. The cited patent teaches that the excitation step is to be carried out with a single infrared laser operating at a single wavelength, said wavelength preferably within the R branch of an infrared absorbtion band of the molecules which contain the elements whose isotopes being separated. The cited patent in no wise teaches, shows or suggests that there is an advantage to be gained by irradiating the molecules at two different wavelengths. The improvement of the instant invention consists in the use of two infrared lasers or a single laser capable of emitting two different wavelengths. The molecules are irradiated first at a wavelength corresponding to an R branch of an absorbtion band of the unexcited molecules and then at a wavelength corresponding to a Q branch of either the same absorbtion band or a different absorbtion band of the excited molecules. This procedure provides an excitation step of improved isotopic selectivity as is demonstrated by the example below.

Multiple photon excitation of the type required by the instant invention may only occur under a set of critical conditions. The molecules must be subjected to radiation at a power density of at least $10^4$ and preferably at least $10^6$ watts per cm$^2$ per torr pressure of said molecules at the R branch wavelength. The total irradiation time must be more than $10^{-10}$ seconds and less than $5 \times 10^{-5}$ seconds. Further, it is necessary that the irradiation be substantially sequential, i.e., the irradiation at the wavelength corresponding to the R branch must be largely finished before most of the Q branch irradiation occurs. There is a further requirement that a second gas be present at a partial pressure of at least 5 times the partial pressure of the gaseous molecules which contain the element whose isotopes are being separated. The reasons for this requirement are related to an effect called anharmonicity and the necessity for rotational relaxation to occur during the excitation process as is described in the above-cited patent.

In case of UF$_6$, it is preferred to perform the first irradiation in the range of either 630 to 638 cm$^{-1}$ or 190 to 198 cm$^{-1}$ and to perform the second irradiation in the range of either 1293 to 1285 cm$^{-1}$, 1159 to 1151 cm$^{-1}$, 628 to 620 cm$^{-1}$ or 188 to 180 cm$^{-1}$.

It is to be recognized that the second set of ranges above are for the Q branch excitation of the already excited molecules. As discussed below there is an effect called anharmonicity which causes the Q branches of excited molecules to lie at somewhat lower energies than unexcited molecules.

It is preferred that the energies given the gaseous molecules in the R and Q excitation steps should be roughly comparable with the energy given in the Q step being somewhat less. Under some operating conditions the absorption coefficient for the Q branch of a given absorption band may be greater than the absorption coefficient for the R branch of that same absorption band. Under such circumstances, it may be advantageous to perform the R branch excitation within one absorption band and to perform the Q branch excitation within another absorption band. Alternatively, this difficulty may be overcome by use of unequal pathlengths for the R and Q excitation laser beams or various other means known in the art.

Example

A computer program was written to simulate the behavior of UF$_6$ under infrared irradiation. This program involved certain approximations as will be discussed, but it is believed that these computer experiments provide a valid comparison of the relative effectiveness of the instant invention with respect to U.S. Ser. No. 480,669 and the CIP's thereof.

Before describing the details of this computer model it is useful to outline the essential concepts involved. First, there is the concept of critical energy. Molecules of UF$_6$ are irradiated, absorb IR photons and become excited. When a UF$_6$ molecule has absorbed enough IR photons so that its total energy (whatever initial vibration energy it had due to thermal excitation plus the energy of the absorbed photons) exceeds a critical value then the computer model considers that UF$_6$ molecule to have been converted via the second step of the instant invention. In practice the efficiency of second step conversion is apt to be less than 100% but this simplification in no wise influences the comparison of the instant invention with the cited prior art.

Second, there is the concept of anharmonicity. When a molecule is vibrationally excited, its infrared absorption spectra are in general shifted toward lower energy. This effect is called anharmonicity. In the computer model it is assumed that the extent of this shift is proportional to the total vibrational energy content of the molecule and independent of the distribution of that energy among the various normal modes of vibration. Again, this simplification is not believed to effect the comparison with prior art.

Third, there is the concept of the thermal distribution among the vibrational states. As mentioned above, UF$_6$ vapor at room temperature is subject to substantial thermal excitation. The distribution of molecules among the ground vibrational state and the various vibrationally excited states may readily be calculated from the published vibrational frequencies of UF$_6$ by use of the well known formulas of statistical mechanics.

Finally, there is the concept of the absorption spectra of UF$_6$ molecules in the ground vibrational state. The absorption spectra of UF$_6$ which is observed at room temperature is the spectra of the thermal distribution among the various vibrational levels. One may, however, calculate the ground state spectra from the appropriate spectroscopic constants and the well known formulas of molecular spectroscopy.

In the light of the above concepts, the nature of the computer model may be explained. A set of irradiation conditions is specified as input to the computer. For these conditions the extent to which ground state UF$_6$ will become singly excited is calculated by use of the absorption spectra of ground state U$^{238}$F$_6$. From said ground state spectra the spectra of the singly photoexcited U$^{238}$F$_6$ molecules is calculated and this spectra is used to determine the extent to which singly photoexcited molecules become doubly excited molecules under the specified irradiation conditions. The computer repeats this procedure as often as is necessary to determine the fraction of ground state molecules which are multiply excited to energies equal to or greater than the critical energy. This entire procedure is then repeated for U$^{238}$F$_6$ molecules in the various thermally excited vibrational states. In this manner, the computer determines the fraction of the thermal distribution of U$^{238}$F$_6$ which is converted by irradiation under specified irradiation conditions. From the known isotope shift, this calculation may be repeated for U$^{235}$F$_6$ and the selectivity of the excitation step determined. From the calculated isotopic composition of the UF$_6$ molecule which are excited above the critical energy and therefore converted and from the calculated isotopic composition of the unconverted UF$_6$ the separative work done (SW) is calculated by use of the well known formulas. The energy absorbed during the excitation step is calculated in electron volts (eV). The electron volt is a convenient and commonly used unit of molecular energy. The total energy used, however, is the sum of the energy absorbed during the excitation step and the energy absorbed during the conversion step. For the purpose of this example it is assumed that the conversion step is photodissociation using light of 3.66 eV, and the total energy absorbed is calculated as the energy absorbed during the excitation step and 3.66 eV per molecule of $UF_6$ converted. The computer model then calculates the efficiency of the isotope separation process, the separative work done per eV of energy absorbed in the excitation and conversion steps, SW/eV.

The molecular constants necessary to do the above calculation have been accurately measured and reported in the scientific literature with two exceptions: the anharmonicity shift constant, X, and the change in rotational constant on excitation, $\Delta B/B$. A value of $0.00253$ cm$^{-1}$ shift per cm$^{-1}$ of excitation is assumed for the former. This value is compatable with the observed shape of the room temperature absorption spectra of $UF_6$. It is assumed that $\Delta B/B$ has a value of 0.0015. This value is within the physically reasonable range for quantities of this kind. It is not believed that the comparison between the instant invention and the cited art would be influenced by the use of approximate values of X and $\Delta B/B$.

It is also to be noted that as an approximation the computer model assumes that complete rotational equilibrium is maintained throughout the excitation step and that such effects as stimulated emission and vibrational deactivation are negligible. Again, it is not believed that these approximations would influence the comparison between the instant invention and the prior art.

Table 1 shows the results of a typical set of computer model calculations. Other calculations have been done on the efficiency of R branch excitation as taught by U.S. Ser. No. 408,669 for a variety of irradiation conditions. The data shown are typical of the best results which the computer model predicts for R branch excitation as taught by U.S. Ser. No. 408,669. The separation efficiency calculated by the computer model under exactly comparable conditions shows a large and surprising improvement for the combined R branch Q branch excitation as taught by the instant invention.

TABLE 1

Physical Constants of $UF_6$ used in Computer Model
Rotational Coupling Constant, B,$=0.0558$ cm$^{-1}$
Coriolis Constant S$=0.20$
Anharmonicity$=0.00253$ cm$^{-1}$/cm$^{-1}$
Wavelength of $v_3$ band$=626$ cm$^{-1}$
Irradiation Conditions used by Computer Model
Critical Energy $E_{crit}=3756$ cm$^{-l}$
Temperature$=300°$ K.
Wavelength of R branch radiation$=637$ cm$^{-1}$
Wavelength of Q branch radiation$=620.5$ cm$^{-1}$
Results of Computer Model Calculations
A. Irradiation of $UF_6$ only in R branch as taught by cited prior art.

| Energy density, joules per cm$^2$ | SW/eV |
|---|---|
| .2 | .05 |
| .4 | .11 |
| .6 | .12 (max.) |
| 1 | .11 |
| 4 | .06 |

B. Irradiation of $UF_6$ first in R branch followed by Q branch Irradiation

Q branch Energy density $= 1.2 \times 10^{-3}$ joules/cm$^2$

| R branch Energy density joules/cm$^2$ | SW/eV |
|---|---|
| .04 | .21 |
| .1 | .35 |
| .3 | .68 (max.) |
| .4 | .6 |
| .6 | .45 |

PREFERRED EMBODIMENT

Uranium ore of natural isotopic abundance is converted to $UF_6$ vapor by means well known in the art. Said $UF_6$ is then irradiated by an infrared laser at a power density of at least $10^6$ watts/cm$^2$ at a wavelength between 630 and 636 cm$^{-1}$ for a time between $10^{-10}$ and $5\times10^{-5}$ seconds in the presence of a second gas, said second gas having a partial pressure 5 times the partial pressure of said $UF_6$, substantially sequentially to said irradiation irradiating said $UF_6$ at a wavelength of 619 to 623 cm$^{-1}$, the total time of both irradiations being less than $5\times10^{-5}$ seconds, whereby the molecules containing the lighter isotope of uranium are preferentially excited, and then preferentially converting said excited $UF_6$ molecules by any means whose rate or selectivity are sensitive to temperature and separating said converted $UF_6$ from $UF_6$ which is either unconverted or has been converted to some chemically different form.

What is claimed is:

1. A method of separating the isotopes of an element, said method being applied to a gaseous compound of said element, and said method comprising subjecting molecules of said compound to radiation from an IR laser at or about a predetermined frequency within the wavelength range corresponding to an R branch of a vibrational absorption band of said gaseous compound, said vibrational absorption band corresponding to a mode of molecular motion in which the said element participates, whereby the molecules containing the lighter isotope or isotopes are preferentially excited and sequentially absorb more than 1 quanta of IR radiation, irradiating said gaseous molecules at a second predetermined wavelength with an IR laser, said second wavelength corresponding to a Q branch of the same or a different vibrational absorption band of said gaseous compound, said same or different vibrational absorption band corresponding to a mode of molecular motion in which the said element participates, whereby the molecules containing the lighter isotopes are further preferentially excited, then preferentially converting the excited molecules by any means whose rate or selectivity is sensitive to temperature and separating said converted molecules from the molecules which are either unconverted or have been converted to some chemically different product.

2. The method of claim 1 wherein said gaseous compound is a compound of uranium.

3. The method of claim 2 wherein the power density of said first irradiation is at least $10^6$ watts/cm$^2$.

4. The method of claim 3 wherein said compound of uranium is $UF_6$.

5. The method of claim 4 wherein said first wavelength is in the range of either 630 to 638 cm$^{-1}$ or 190 to 198 cm$^{-1}$.

6. The method of claim 5 wherein said second irradiation is in the range of either 1293 to 1285 cm$^{-1}$, 1159 to 1151 cm$^{-1}$, 628 to 620 cm$^{-1}$, or 188 to 180 cm$^{-1}$.

* * * * *